United States Patent
Gupta et al.

(10) Patent No.: US 11,516,522 B1
(45) Date of Patent: Nov. 29, 2022

(54) SYSTEM AND METHOD FOR IDENTIFYING POTENTIAL COMMERCIAL BREAKS IN A VIDEO DATA STREAM BY DETECTING ABSENCE OF IDENTIFIED PERSONS ASSOCIATED WITH PROGRAM TYPE CONTENT IN THE VIDEO DATA STREAM

(71) Applicant: Alphonso Inc., Mountain View, CA (US)

(72) Inventors: Manish Gupta, Bangalore (IN); Shubham Sopan Dighe, Pune (IN)

(73) Assignee: ALPHONSO INC., Mountain View, CA (US)

( * ) Notice: Subject to any disclaimer, the term of this patent is extended or adjusted under 35 U.S.C. 154(b) by 0 days.

(21) Appl. No.: 17/366,739

(22) Filed: Jul. 2, 2021

(51) Int. Cl.
| | |
|---|---|
| *H04N 21/234* | (2011.01) |
| *H04N 21/81* | (2011.01) |
| *H04N 21/439* | (2011.01) |
| *H04N 21/442* | (2011.01) |
| *H04N 21/422* | (2011.01) |
| *H04N 21/845* | (2011.01) |

(52) U.S. Cl.
CPC . *H04N 21/23424* (2013.01); *H04N 21/42203* (2013.01); *H04N 21/4394* (2013.01); *H04N 21/44218* (2013.01); *H04N 21/812* (2013.01); *H04N 21/8456* (2013.01)

(58) Field of Classification Search
CPC ....... H04N 21/23424; H04N 21/42203; H04N 21/4394; H04N 21/44218; H04N 21/812; H04N 21/8456; H04N 21/44008; H04N 21/23418; H04N 21/8133; H04N 5/23219; H04N 5/147

USPC .......................................................... 725/32
See application file for complete search history.

(56) References Cited

U.S. PATENT DOCUMENTS

| | | | |
|---|---|---|---|
| 6,469,749 B1 * | 10/2002 | Dimitrova | H04N 21/454 348/700 |
| 9,015,139 B2 | 4/2015 | Wong | |
| 9,628,836 B1 | 4/2017 | Kalampoukas et al. | |
| 10,108,718 B2 | 10/2018 | Kalampoukas et al. | |
| 10,346,474 B1 | 7/2019 | Kalampoukas et al. | |
| 10,462,535 B2 | 10/2019 | Carter et al. | |
| 10,945,030 B2 | 3/2021 | Kalampoukas et al. | |
| 2004/0062520 A1 * | 4/2004 | Gutta | H04N 21/4394 386/249 |
| 2013/0223816 A1 * | 8/2013 | Gharaat | G06F 3/1454 386/249 |
| 2014/0282673 A1 * | 9/2014 | Neumeier | H04N 21/8126 725/19 |
| 2016/0094863 A1 * | 3/2016 | Helferty | H04N 21/44008 725/32 |
| 2019/0208287 A1 * | 7/2019 | Newell | H04N 21/4223 |

(Continued)

OTHER PUBLICATIONS

Satterwhite et al., "Potentials," IEEE, vol. 23, Issue 2, pp. 9-12 (Apr.-May 2004).

(Continued)

*Primary Examiner* — Cynthia M Fogg
(74) *Attorney, Agent, or Firm* — Panitch Schwarze Belisario & Nadel LLP (57) ABSTRACT

Ad break boundaries, which identify start and end points of a commercial break, are identified by detecting the absence of voices and/or facial images of one or more primary cast members of a currently scheduled program.

6 Claims, 9 Drawing Sheets

System to Detect Ad-Block Boundaries (56) References Cited

U.S. PATENT DOCUMENTS

2020/0134875 A1\* 4/2020 Yi .................... G06K 9/6215

OTHER PUBLICATIONS

Wikipedia entry for "Facial recognition system" Downloaded from: https://en.wikipedia.org/wiki/Facial_recognition_system>, download date: May 26, 2021, last edited date: May 23, 2021, 29 pages.
Wikipedia entry for "Speaker recognition" Downloaded from: https://en.wikipedia.org/wiki/Speaker_recognition, download date: Apr. 30, 2021, last edited date: May 23, 2021, 6 pages.

\* cited by examiner

Figure 1: The Ad-Breaks on TV are embedded in TV programs
(Prior Art)

Figure 2: Zooming into the contents around the Ad-Break boundaries.

Figure 3A: System to Detect Ad-Block Boundaries

Figure 3B: System to Detect Ad-Block Boundaries

| program | previously identified person (e.g., primary cast member) | speaker recognition data 712 of previously identified person (e.g., primary cast member) | facial recognition data 714 of previously identified person (e.g., primary cast member) |
|---|---|---|---|
| Seinfeld | Jerry Seinfeld | | |
| Seinfeld | Julia Louise-Dreyfus | | |
| Seinfeld | Jason Alexander | | |
| Seinfeld | Michael Richards | | |
| : | : | | |
| The View | Joy Behar | | |
| The View | Whoopi Goldberg | | |
| The View | Sunny Hostin | | |
| The View | Meghan McCain | | |
| The Ellen DeGeneres Show | Ellen DeGeneres | | |
| ... | ... | | | first database 708

Figure 4A first database 708'

| program | dynamically identified person (e.g., primary cast member) | speaker recognition data 712 of dynamically identified person (e.g., primary cast member) | facial recognition data 714 of dynamically identified person (e.g., primary cast member) |
|---|---|---|---|
| Seinfeld | 1456677899 | | |
| Seinfeld | 2355567888 | | |
| Seinfeld | 7776554333 | | |
| Seinfeld | 999975222 | | |
| .. | .. | | |
| .. | .. | | |
| The View | 444433333 | | |
| The View | 556799789 | | |
| The View | 766328007 | | |
| The View | 542186665 | | |
| The Ellen DeGeneres Show | 667895544 | | |
| | | | |
| .. | .. | | |
| .. | .. | | |
| .. | .. | | |

Figure 4B second database 720

| video data stream | time interval | recognition data detected? |
|---|---|---|
| 1234 | 1000001 | Y |
| 1234 | 1000002 | Y |
| 1234 | 1000003 | Y |
| 1234 | 1000004 | Y |
| 1234 | 1000005 | N |
| 1234 | 1000006 | N |
| 1234 | 1000007 | N |
| 1234 | 1000008 | N |
| 1234 | 1000009 | Y |
| 1234 | 1000010 | Y |
| 1234 | 1000011 | Y |
| 1234 | 1000012 | Y |

Figure 5

| rules database 724 | rule | rule 1 | rule 2 | .. | .. | rule *n* |
|---|---|---|---|---|---|---|

SYSTEM AND METHOD FOR IDENTIFYING POTENTIAL COMMERCIAL BREAKS IN A VIDEO DATA STREAM BY DETECTING ABSENCE OF IDENTIFIED PERSONS ASSOCIATED WITH PROGRAM TYPE CONTENT IN THE VIDEO DATA STREAM

BACKGROUND OF THE INVENTION

TV advertising commercials exist in virtually all video data streams, subsidizing some or all of the cost of providing the content to the viewer, and allowing for monetization of the content. The ability to identify where the commercials exist in the video data stream has become an important goal for a number of reasons. First, advertisers who pay to place the commercials wish to verify that the commercials were actually played, either by being "aired" during a broadcast, or "streamed" during an internet-based viewing session. The auditing process can be greatly enhanced if commercials can be identified as they are being played so that there can be a recordation to document the airing or streaming. Second, technology built into a video playing device, or executing concurrently with a video playing device, can "skip" commercials, assuming that the location of the commercials can be accurately identified so that no programming is skipped. Third, certain companies need to create a database of all currently aired or streamed commercials across a large number of media channels for use by their customers, typically for marketing campaign purposes. While media channels provide detailed information regarding program content that is aired or streamed via electronic program guides, neither these guides nor any other source of information is readily available indicating what commercials are being aired or streamed during the program content. Thus, the companies that need to create a database of all currently aired or streamed commercials must independently determine and compile the information to populate the database of all currently aired or streamed commercials.

Some conventional technology for identifying where commercials exist in a video data stream is described in an article entitled "Automatic Detection of TV Commercials" (Satterwhite, B.; Marques, O.; Potentials, IEEE, Volume 23, Issue 2, April-May 2004 pp. 9-12). Satterwhite et al. describes two main categories of methods for detecting commercials, namely, "feature-based detection" and "recognition-based detection." Feature-based detection uses general characteristics of commercials embedded within a media stream to detect their possible presence. Recognition-based detection works by trying to match commercials with ones that were already learned. Some general characteristics (heuristics) of commercials and commercial breaks include the following:

i. Multiple frames of black are displayed at the beginning and end of each commercial block and between each commercial in the block. There is no audio during these frames.

ii. If a network displays a logo in the corner of the screen, the logo may not appear during the commercials.

iii. Duration is typically some increment of 15 seconds, up to 90 seconds.

iv. Commercials are high in "action," measured by a relatively larger number of cuts per minute between frames compared to a TV show.

v. Commercial breaks tend to occur around the same time in each episode of a given TV series.

Other techniques for identifying potential commercials or commercial breaks in a video data stream are described in U.S. Pat. No. 10,108,718 (Kalampoukas), U.S. Pat. No. 10,346,474 (Kalampoukas et al.) and U.S. Pat. No. 10,945,030 (Kalampoukas et al.), each of which are incorporated by reference herein. U.S. Pat. Nos. 10,108,718 and 10,346,474 detect repeating content in the video data stream, such as commercials, to identify potential commercials. U.S. Pat. No. 10,945,030 detects time differences of transitions in the audio or video of the video data stream, and time differences which are an integer multiple of a first predetermined time length, and that have an overall time length that is equal to or less than a second predetermined time length are identified. The contents of the video data stream associated with the identified time differences are flagged as potential commercials.

Despite the myriad of existing technology for identifying where commercials and commercial breaks potentially exist in a video data stream, there is still a need to provide additional technology to identify where commercials and commercial breaks potentially exist in a video data stream which may be used on its own, or in combination with existing technology to enhance the effectiveness of the existing technology to more accurately identify where commercials and commercial breaks potentially exist in a video data stream. The present invention fulfills such a need.

SUMMARY OF THE PRESENT INVENTION

Ad break boundaries, which identify start and end points of a commercial break, are identified by detecting the absence of voices and/or facial images of one or more primary cast members of a currently scheduled program.

BRIEF DESCRIPTION OF THE DRAWINGS

Preferred embodiments of the present invention will now be described by way of example with reference to the accompanying drawings.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

I. Definitions

The following definitions are provided to promote understanding of the present invention.

video data stream (also, referred to interchangeably as a "TV stream" and a "TV channel stream")—A video data stream includes (i) a conventional broadcast TV signal, typically delivered over a cable or fiber optic network via a set top box, CableCARD® or the like to a TV, (ii) an over-the-air (OTA) broadcast TV signal, and (iii) streaming services that deliver video content to a TV device that is connected to a viewer's home network. A video data stream may also be referred to as a "stream of audiovisual data" or an "audiovisual stream" since a video data stream typically includes audio. The video data stream described herein may be sampled at consecutive time intervals.

commercial (also, referred to interchangeably as an "advertisement" or "ad")—A "commercial" is an advertisement for a product or service, and also includes advertising for program type content, known in the TV industry as a "promo." A commercial is thus distinguishable from "program type content." An example of "program type content" is a TV show.

commercial break (also, referred to interchangeably as an "ad break," "block of commercial content," "commercial block," "ad block," or "ad pod")—Each commercial break includes a plurality of successive individual commercials. That is, the commercials are aired back-to-back in a set or group. Commercial breaks are interspersed during a TV program. The total length of the commercial breaks aired during a TV show is almost always significantly shorter than the length of the TV show. Likewise, the length of one commercial break is almost always significantly shorter than the lengths of the TV show segments that precede and follow the commercial break. A typical broadcast TV channel airs about 20 minutes of commercial content per hour. One common format for a commercial break is to show national advertisements first, followed by regional/local advertisements, and concluding with promos.

identified persons (identified persons associated with the program type content)—These are persons who appear in program type content, and will typically also speak in the program type content. Identified persons also include animation characters who may have human or synthesized voices. In one preferred embodiment of the present invention, only specific types of program content are selected for identifying persons who appear in the program type content, namely, a recurring TV show or TV series. Movies are another type of program type content having identified persons associated therewith. In one embodiment of the present invention, the identified persons are "previously identified persons" (previously identified persons associated with the program type content). In this embodiment, a database is pre-populated with recognition data (see definition below) regarding the persons. In another embodiment, the database is built dynamically (on-the-fly) using auto-detection, and the identified persons are not previously known, as described in more detail below. In this embodiment, the person need not even be identified by name, and may simply be assigned a unique identification (ID) number. In this embodiment, the identified persons are referred to herein as "dynamically identified persons" (dynamically identified persons associated with the program type content).

primary cast member—A primary case member is a person who regularly appears in a specific program type content, such as a recurring TV show or TV series (collectively referred to herein as "programs"). The majority of programs on TV, such as sitcoms, dramas, talk shows, and news programming have a primary cast which is part of most or all episodes of the program. For example, the cast of "Seinfeld" includes Jerry Seinfeld, Julia Louise-Dreyfus, Jason Alexander, and Michael Richards. The cast of the talk show, "The View" includes Joy Behar, Whoopi Goldberg, Sunny Hostin, and Meghan McCain. A TV show may also have only one primary cast member, such as the talk show "The Ellen DeGeneres Show" (Ellen) which stars only Ellen DeGeneres." At least one primary cast member speaks and/or is visible in most of the content of such TV shows. Movies also have primary cast members. Some talk shows like Ellen have segments where the primary cast member does not speak and is not visible, such as when a musical guest plays, but for most of the show, the primary cast member is either speaking or is visible.

recognition data (recognition data of the identified persons associated with the program type content)—Recognition data includes data that allows an automated system to identify when an identified person is present in the program type content. In one preferred embodiment, the recognition data includes speaker recognition data, or facial recognition data, or speaker and facial recognition data. Speaker recognition is the identification of a person from characteristics of voices. Speaker recognition data allows an automated system to identify who is speaking. Facial recognition is the identification of a person by matching a captured image of their face from a digital image or a video frame against a database of previously identified faces. Similar to speaker recognition data, facial recognition data allows an automated system to identify a person who appears in a digital image or video frame. In one preferred embodiment wherein the identified persons are "previously identified persons," the recognition data of the previously identified persons are pre-captured and stored in a database for subsequent use when performing the identification. In the dynamic, auto-detect embodiment, the recognition data is built on-the-fly. In both embodiments, the recognition data serves the exact same purpose.

automatic recognition software—Automatic recognition software, as used herein, refers to recognition software that uses recognition data to identify when an identified person is present in the program type content. As explained above, in one preferred embodiment, the recognition data of previously identified persons are pre-captured and stored in a database for subsequent use when performing the identification. The automated recognition software is then used to compare a sampled portion of the video data stream (newly captured audio and/or video data) to the previously stored recognition data to determine whether any of the previously identified persons (e.g., primary cast members) are identified in the sampled portion of the video data stream. In the dynamic, auto-detect embodiment, uniquely identifiable persons are detected within a video data stream by the automatic recognition software, and if the same persons appear in extended durations of the video data stream (as also detected by the automatic recognition software), those persons are given a unique identity and are presumed to be appearing in program type content. In one preferred embodiment, the automatic recognition software includes a voice recognition system that performs speaker recognition, as described above. In another preferred embodiment, the automatic recognition software includes a voice recognition system and a facial recognition system for performing facial recognition, as also described above.

II. Overview

Figure 1:
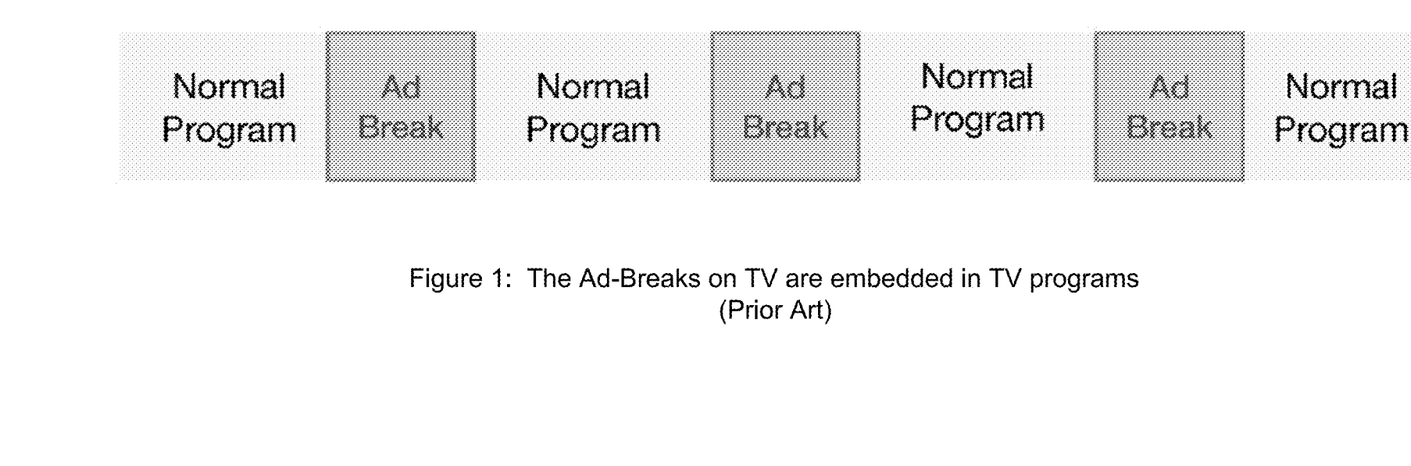
FIG. 1 shows a prior art depiction of a video data stream, such as a conventional broadcast TV signal, wherein commercial breaks (ad breaks) are interspersed between segments of program type content (normal program).

FIG. 1 shows a prior art depiction of a video data stream, such as a conventional broadcast TV signal, wherein commercial breaks (ad breaks) are interspersed between segments of program type content (normal program).

Figure 2:
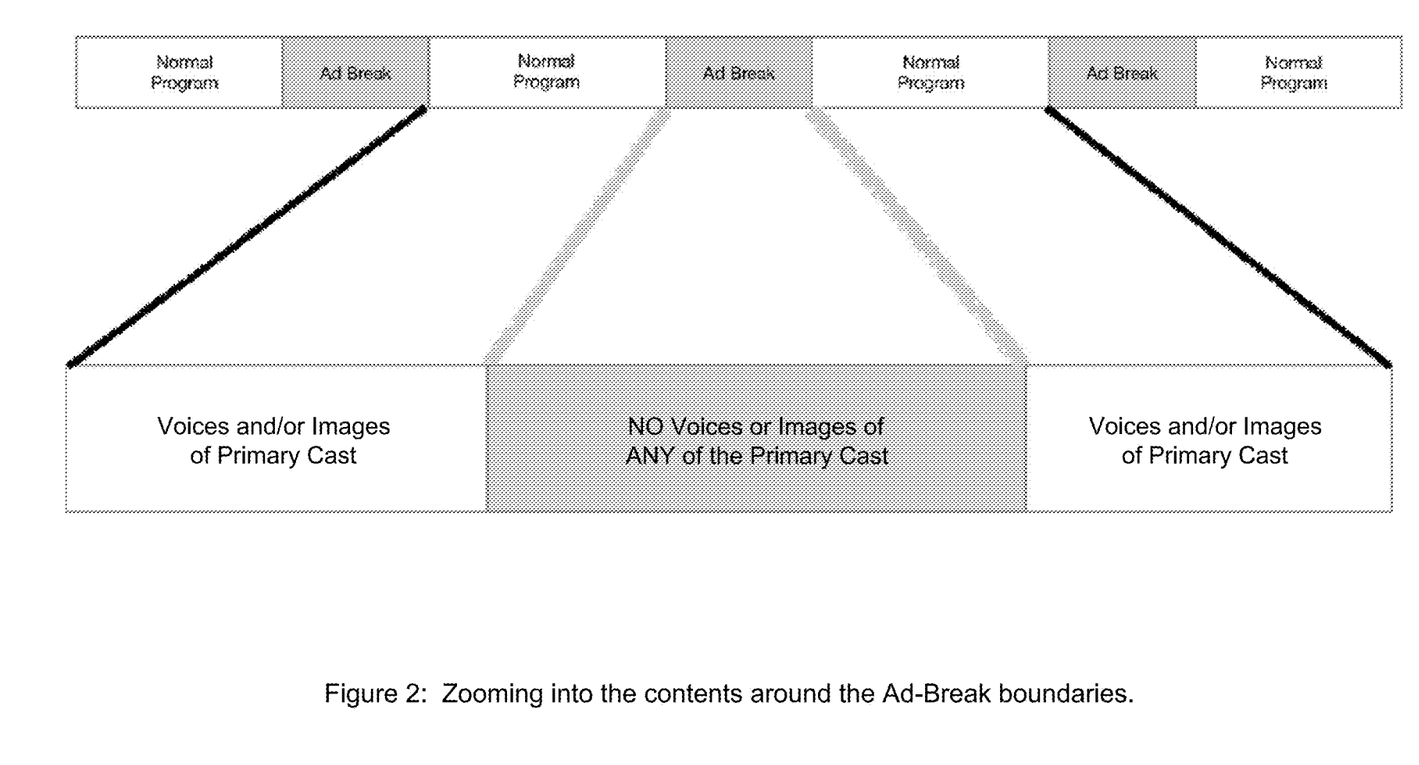
FIG. 2 illustrates the concept that is leveraged for the present invention, namely that during the normal program, voices and/or facial images of one or more primary cast members are typically present, whereas during ad breaks, voices and/or facial images of one or more primary cast members are typically not present.

FIG. 2 illustrates the concept that is leveraged for the present invention, namely that during the normal program, voices and/or facial images of one or more primary cast members are typically present, whereas during ad breaks, voices and/or facial images of one or more primary cast members are typically not present. Ad break boundaries (start and end points of a commercial break) can be detected using this information.

Figure 3A:
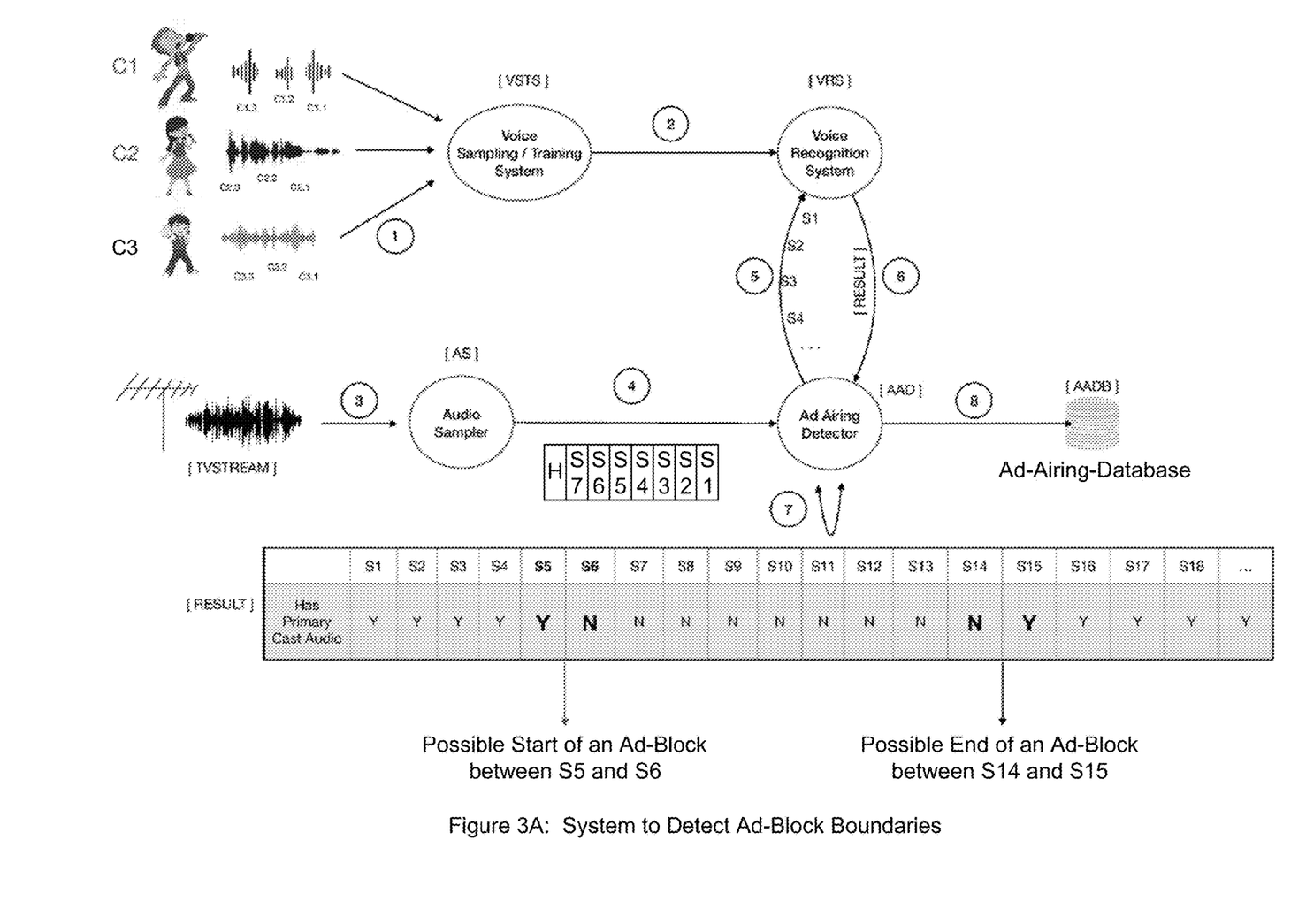
FIGS. 3A and 3B illustrate systems to detect ad block boundaries in accordance with one preferred embodiment of the present invention.

FIG. 3A illustrates how audio data is used to detect potential start and end points of a commercial break (ad block boundaries). System components include the following elements:

Voice Sampling & Training System (VSTS): This system extracts voice samples of primary cast members from a TV Show (program). This may be performed semi-automatically and may be a one-time activity which can be performed with some assistance by human curators. For example, a human curator would sit and watch a few episodes of the program and clip out segments containing clean voice samples of primary cast members. The system would use the voice samples to train the Voice Recognition System (VRS).

Voice Recognition System (VRS): The VRS is a system that recognizes a speaker given a voice sample. As discussed above, such systems are well-known in the art. This system is trained by the VSTS and is used by Ad-Airing-Detector (AAD).

Audio Sampler (AS): The audio sampler is a system that captures an audio/video stream and extracts discrete audio-samples therefrom for the purpose of voice recognition.

Ad Airing Detector (AAD): The AAD is a system to detect ad-break boundaries in an audio/video stream.

Ad Airing Database (AADB): This is a persistence database where data records representing ad-breaks can be stored.

In operation, audio samples are obtained from each of the primary cast members of all currently broadcast TV shows. These audio samples may be obtained from existing TV show material. The audio samples are inputted into the VSTS which is used for subsequent speaker recognition by the VRS. As well-known in the art, speaker recognition uses acoustic features or patterns of speech that have been found to differ between individuals. These acoustic features or patterns of speech reflect both anatomy and learned behavioral patterns. The type of speaker recognition used herein is preferably text-independent, as opposed to text-dependent, because it is not necessary to match words or phrases of the primary cast members with the same words or phrases in the recognition data, as would be required by a text-dependent process.

Referring to FIG. 3A, during a training phase, the VSTS extracts voice samples of the primary cast members for each program (step 1). The primary cast members are depicted as C1, C2, and C3 for this particular program. The VSTS then trains the VRS using the extracted voice samples (step 2). Any suitable commercial speaker recognition/voice recognition system may be used to perform these functions. While some conventional systems require guided training wherein each speaker must be recorded uttering the same specific words and/or sentences, many conventional systems exist which can merely be programmed by entering existing samples of the speaker's voice, even though the different speaker utter completely different sentences.

To detect commercial breaks during a particular program of interest, the audio sampler (AS) extracts discrete audio samples from a video data stream which may be carrying the program of interest (step 3). The audio sampler sends the extracted audio samples to the ad airing detector (AAD) (step 4). The AAD sends audio samples to the VRS (step 5). The VRS responds with a [RESULT] for each sample indicating whether the audio sample is carrying a voice of any of the primary cast members of the program being sampled (step 6). The VRS forms a Boolean vector and determines where the ad boundaries potentially exist (step 7). The VRS then saves the ad break details into the ad airing database (AADB) (step 8).

In the example of FIG. 3A, audio samples S1-S4 and audio samples starting with S15 are determined to include audio of a primary cast member, whereas audio samples S6-S14 are determined not to include audio of a primary cast member. Accordingly, the time segment between S6 and S14 may be a potential ad block.

Figure 3B:
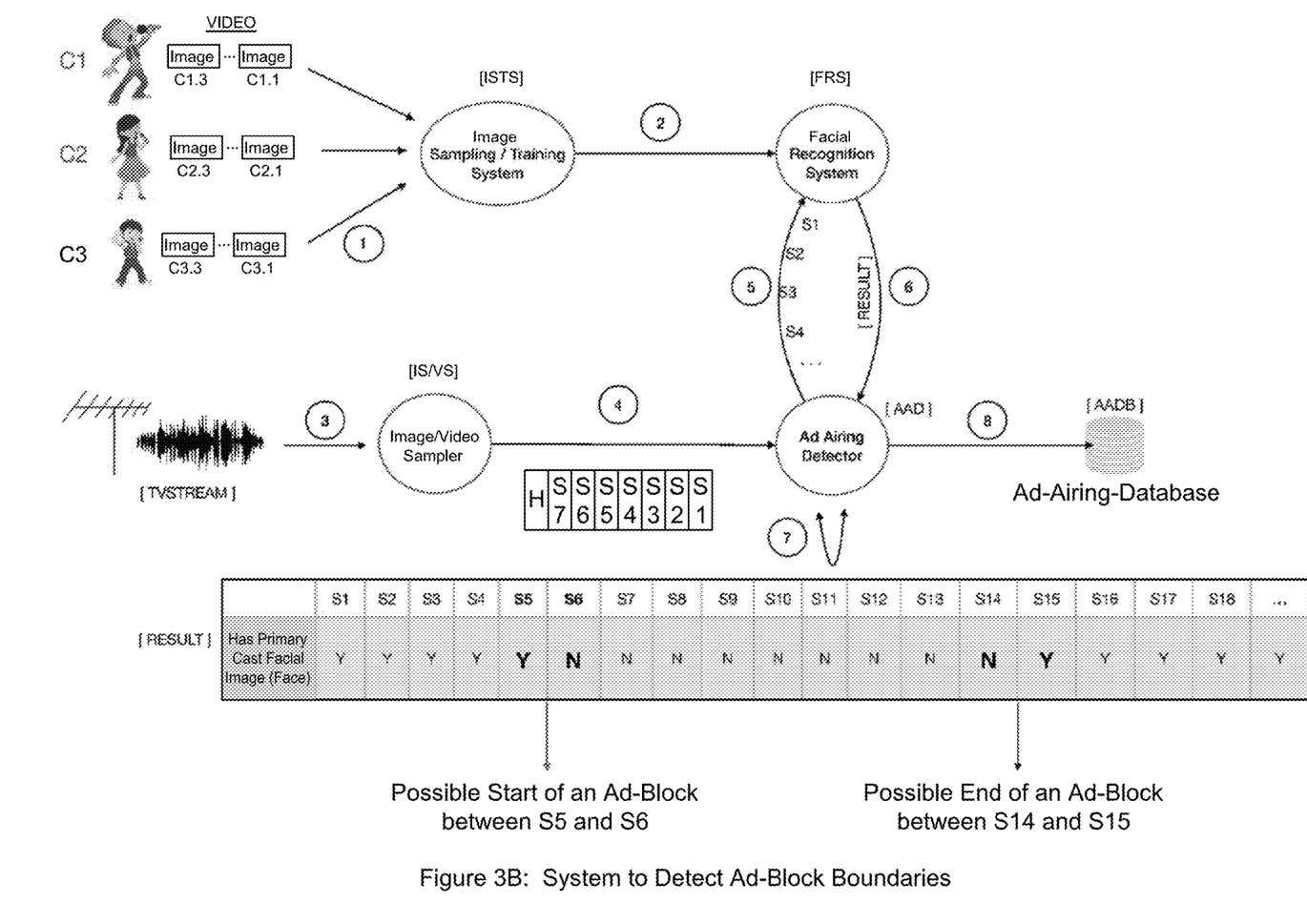

FIG. 3B illustrates how image data is used to detect potential start and end points of a commercial break (ad block boundaries). FIG. 3B is similar to FIG. 3A, except that samples taken from the primary cast members C1-C3 are image samples; the VSTS of FIG. 3A is replaced by an Image Sampling/Training System (ISTS); the VRS of FIG. 3A is replaced by a Facial Recognition System (FRS); the Audio Sampler (AS) of FIG. 3A is replaced by an Image/Video Sampler (IS/VS); and the [RESULT] is whether a sample has a Primary Cast Facial Image (Face), instead of Primary Cast Audio as shown in FIG. 3A.

As further discussed below with respect to FIG. 7, the embodiments of FIGS. 3A and 3B may be practiced concurrently for improved performance.

III. Detailed Disclosure

Figure 6:
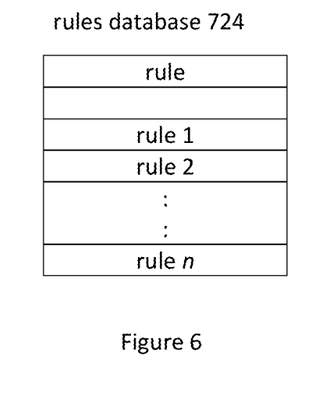
Figure 7:
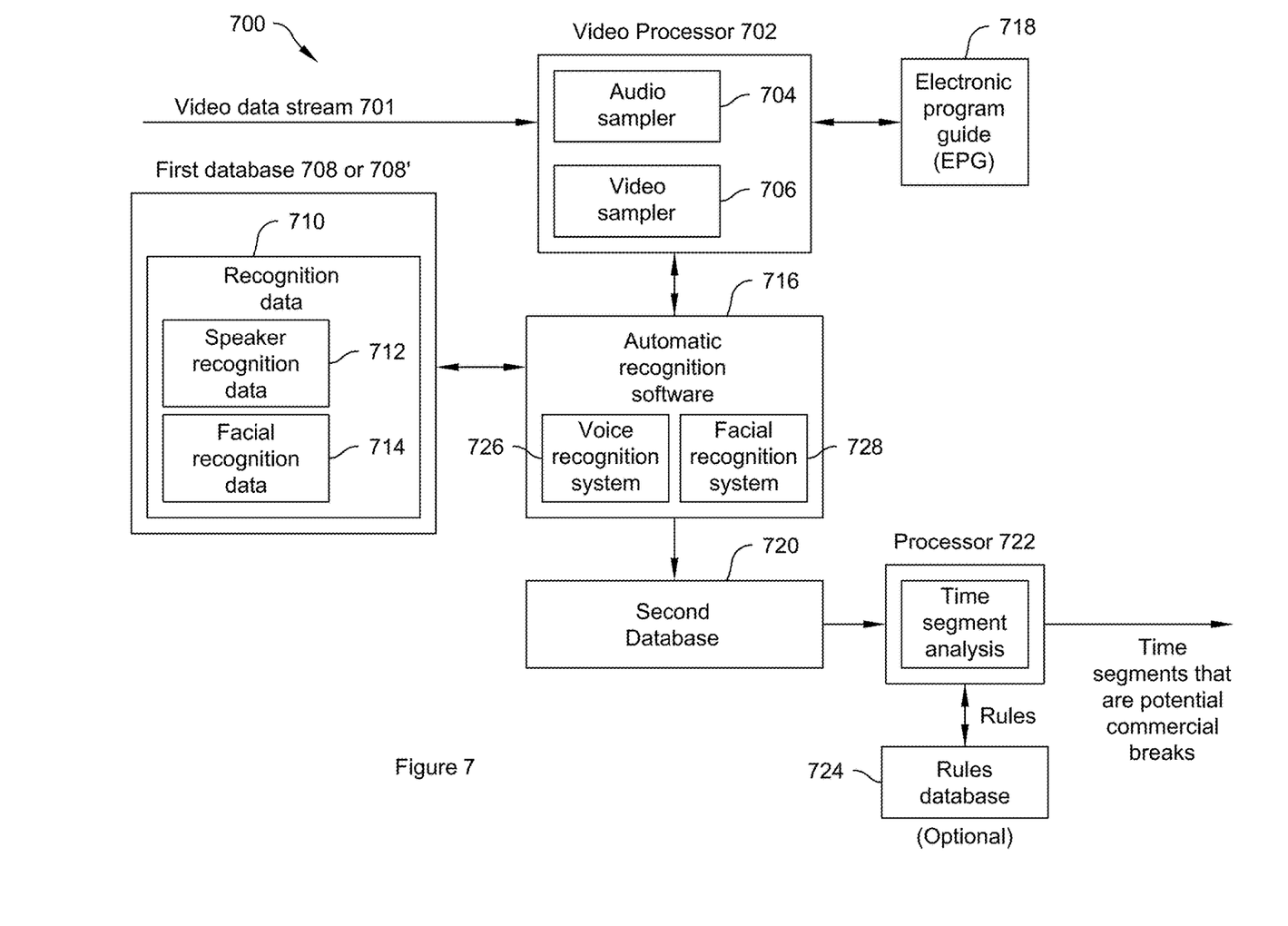
FIG. 7 is a schematic diagram of an apparatus for implementing one preferred embodiment of the present invention.

FIG. 7 is a schematic diagram of an apparatus, labeled as system 700, for implementing one preferred embodiment of the present invention. FIG. 7 is described with reference to databases shown in FIGS. 4-6. A TV channel feed or streaming media feed (hereafter, collectively referred to as a "video data stream 701") is received by video processor 702. For illustration purposes, FIG. 7 shows only one video data stream 701. However, the system 700 preferably is configured to process a large number of different video data streams 701. For example, if there are 500 channels on a cable TV system, there will be 500 separate data streams. The video data stream 701 includes audio and video data.

The video processor 702 includes audio sampler 704 (also, referred to above as audio sampler [AS]) and video sampler 706. (The video processor 702 thus also performs the function of an audio processor.) The video sampler 706 captures individual frames for image analysis. The audio sampler 704 and the video sampler 706 sample the video data stream 701 at consecutive time intervals. The time intervals may be different for the audio sampler 704 and the video sampler 706. Each of the different video data stream 701 has its own time intervals. However, the time intervals are preferably the same for each of the different time intervals to simplify the sampling process.

Figure 4A:
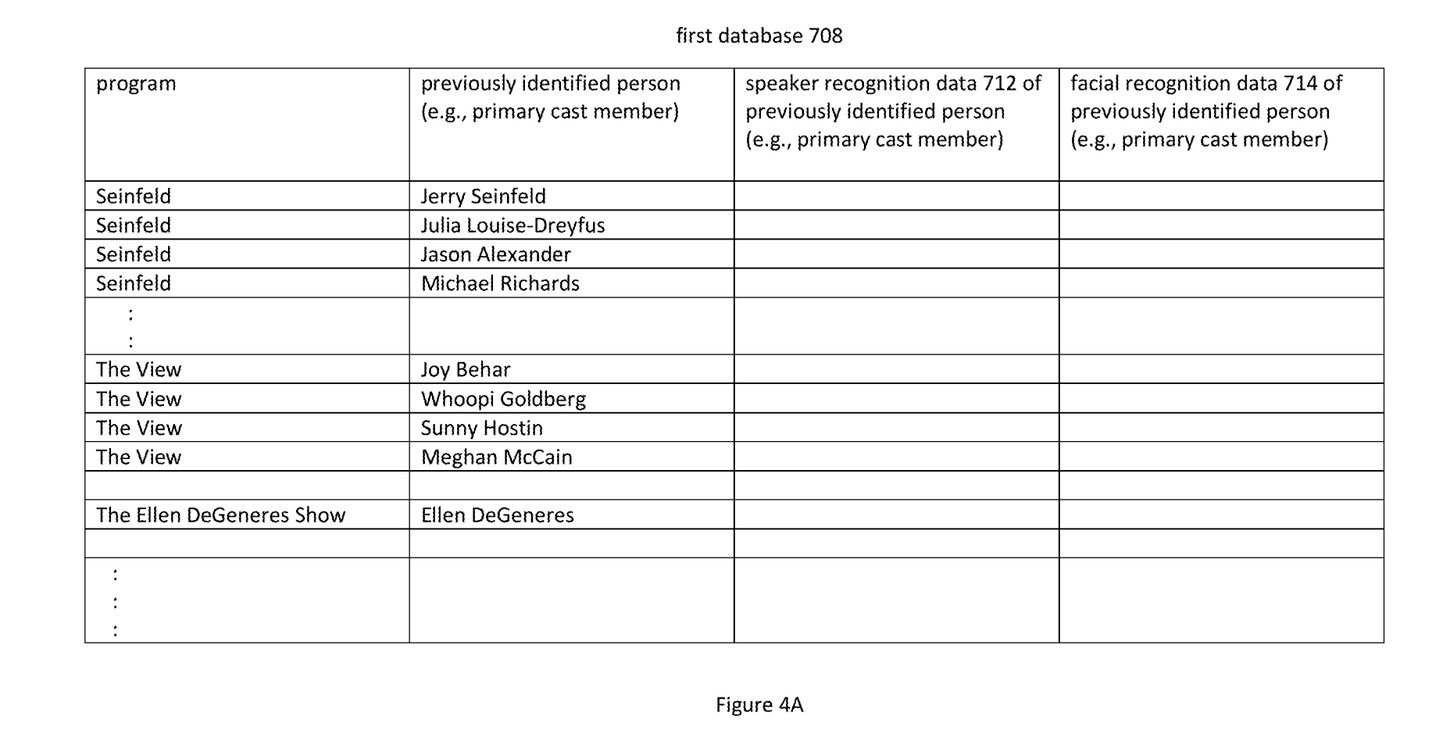
FIGS. 4A, 4B, 5, and 6 are database tables used in preferred embodiments of the present invention.
Figure 4B:
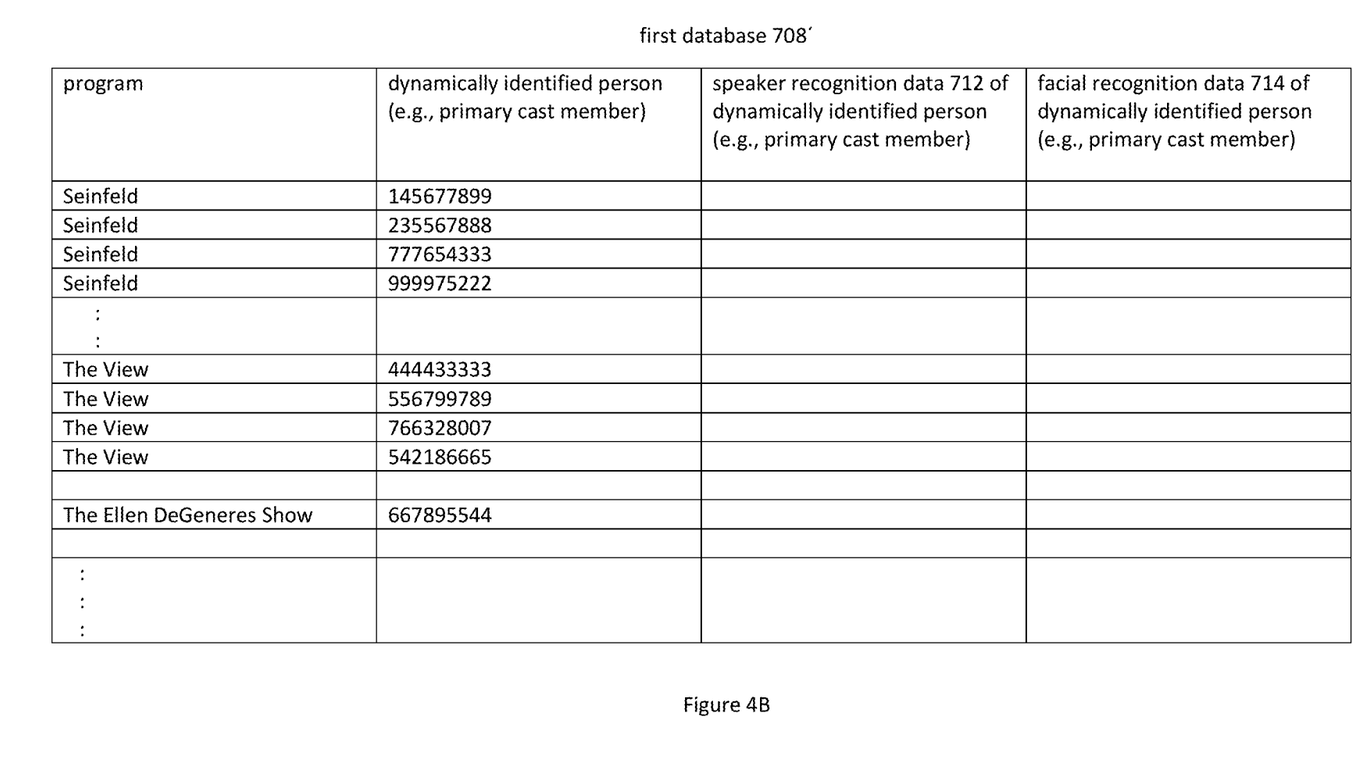

The system 700 also includes first database 708 or 708' which stores recognition data 710 of identified persons (e.g., primary cast members) associated with a plurality of different programs. The recognition data 710 includes speaker recognition data 712 and, optionally, facial recognition data 714. The recognition data 710 is obtained from a previous sampling process. The speaker recognition data 712 is obtained from the VSTS, as described above, and the facial recognition data 714 is obtained from an analogous sampling/training process that uses image frames of identified persons. FIGS. 4A and 4B show selected contents of the respective first databases 708 and 708'. In FIG. 4A, the identified persons are previously identified persons, whereas in FIG. 4B, the identified persons are dynamically identified persons. The dynamically identified persons are simply uniquely identified persons since no actor name or other unique metadata is necessary to identify the person in this embodiment. Accordingly, the identified persons may simply be identified by a unique ID number.

The system 700 further includes automatic recognition software 716 which is in electronic communication with the video processor 702 and the first database 708 or 708' of recognition data 710 which is configured to identify whether any recognition data 710 is detected in each of the consecutive time intervals. The video processor 702 preferably knows which program is currently present in the video data stream 701, such as by receiving data from electronic program guide (EPG) 718, or from metadata in the video data stream 701, as described in more detail below. In this manner, the identification of whether any recognition data 710 is detected in each of the consecutive time intervals is performed using only the identified persons who are associated with the program that is currently present in the video data stream 701. This significantly reduces the processing time and processing resources required by the automatic recognition software 716.

The automatic recognition software 716 includes the voice recognition system (VRS) 726 described above with respect to FIG. 3A, and may optionally include a facial recognition system (FRS) 728, as described in more detail below, and also illustrated in FIG. 3B. The VRS 726 in FIG. 3A works in conjunction with the speaker recognition data 712, and the FRS 728 in FIG. 3B works in conjunction with the facial recognition data 714.

When using the embodiment that relies upon dynamically identified persons instead of previously identified persons, the first database 708' is populated dynamically (on-the-fly). Accordingly, the automatic recognition software 716 must perform an additional function of initially identifying unique persons by their unique facial features and/or voices, and then detecting a repetition of these facial features and/or voices over an extended period of time in a video data stream, so as to determine when an entry should be made in the first database 708' for a repeatedly identified person. Of course, the automatic recognition software 716 is still used in the same manner as the embodiment that relies on previously identified persons to identify whether a particular program segment contains an identified person. Ideally, the speaker recognition data 712 and the facial recognition data 714 should be identical in both embodiments since the same identified persons (e.g., primary cast members) should be detected, even though they are identified by a name in one embodiment, and are identified by a unique number in the other embodiment.

Figure 5:
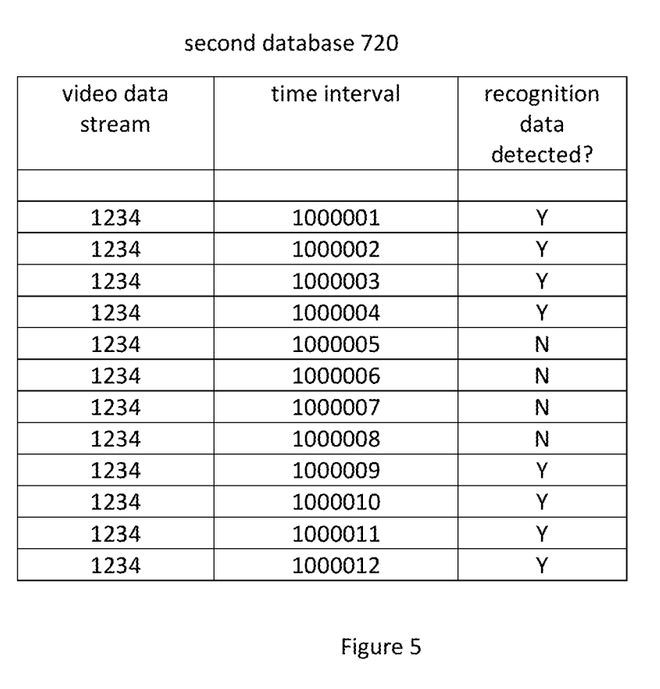

The output of the automatic recognition software 716 is sent to second database 720 that records for each time interval whether or not any recognition data 710 has been detected. FIG. 5 shows selected contents of the second database 720. Processor 722 in electronic communication with the second database 720 is configured to identify time segments that are potential commercial breaks by identifying a plurality of consecutive time intervals where no recognition data 710 is detected. As discussed below, an optional rules database 724 (depicted in FIG. 6) may assist in that process. The output of the time segment analysis performed by the processor 722 are time segments within the original video data stream 701 that are potential commercial breaks. These time segments may then be used for any suitable purpose, such as those described in the background section above (e.g., auditing, commercial skipping, identification and cataloguing of new commercials). In the case of identification and cataloguing of new commercials, the time segments may be used by a content processing platform as described in U.S. Pat. No. 10,945,030 which applies any combination of automated, semi-automated and manual (human-aided) processes to the corresponding portion(s) of the video data stream to determine if a potential commercial is actually a commercial, and if so, confirms the exact start and stop time represented by a date and time of day. The content processing platform also tags the commercial with appropriate metadata, as is also well-known in the art. The commercial and its metadata may then be added to a library of known commercials. That is, once a commercial has been properly clipped by the platform, appropriate identification and metadata is associated with the clip. FIG. 3 of U.S. Pat. No. 9,628,836 (Kalampoukas et al.), which is incorporated by reference herein, shows an example of how commercials are stored with identification information and metadata.

IV. Additional Considerations

A. Sampling Periods

The sampling process performed by the audio sampler 704 and the video sampler 706 may be varied depending upon processing availability and desired accuracy. In one example, described for illustration purposes only, sampling may occur in 20 second time intervals. Regarding FIGS. 3A and 3B, this would mean that S1 is taken at T1, S2 is taken at T1+20 seconds, S3 is taken at T1+40 seconds, and so on. Of course, S1 is not the beginning of the video data stream, but is merely an arbitrary location selected for purposes of illustration of a snippet of the video data stream. In the examples depicted in FIGS. 3A and 3B, if the samples are taken at 20 second time intervals, the potential commercial break would be 3 minutes long, since it encompasses nine samples (180 second which equals 3 minutes).

The scope of the present invention includes other sampling periods that allow for the goals of the present invention to be achieved, namely, to reasonably identify a potential commercial break. If a sampling period is too long, the start and end of a commercial break may be difficult to ascertain because the program may have transitioned to or from a commercial break well before or well after a sample would indicate that the transition has occurred. In fact, a 20 second sampling interval is too long for practical purposes, but was used in the example above for illustration purposes only. Preferably, one would want to know within a one second interval or less whether a program has transitioned to or from a commercial so that the commercial block can be accurately identified. In the examples of FIGS. 3A and 3B, which are provided for illustration purposes only, a one second sampling interval would mean that the potential commercial break is 9 seconds. The average commercial break is currently about 2 minutes, and commercial breaks are rarely less than 15 seconds.

B. Facial Recognition

As described above, a facial recognition system (FRS) may be incorporated into preferred embodiments of the present invention to work in conjunction with the VRS. The FRS may provide the following enhancements to the overall system:

1. The FRS may detect the facial presence of a primary cast member during each sampling period, resulting in a Y/N output, similar to the Y/N output described above with respect to audio. A Boolean "OR" operation may then be performed to determine the resultant Y/N output for the sampling period, as shown in Table 1 below:

TABLE 1

| Primary cast member audio detected? | Primary cast member face detected? | Resultant output for sampling period |
|---|---|---|
| Y | Y | Y |
| Y | N | Y |
| N | Y | Y |
| N | N | N |

Facial recognition may significantly increase the likelihood of properly classifying a portion of the video data stream as being program type content because even if there is a sampling period with no spoken dialogue from a primary cast member, there is a high likelihood that one of their faces will appear in the frames of the sampling period.

2. The FRS may also improve the accuracy of the overall process, particularly if the audio detection process is degraded by poor audio quality, background noise, simultaneous speakers, and the like, which may prevent the VRS from properly detecting that a primary cast member is speaking.

C. Use of Rules in a Rules Database to Enhance Accuracy of Ad Block Detection

To further enhance the accuracy of the overall process, rules from a rules database may be automatically applied to the [RESULT] shown in FIG. 3A, or to the result of using facial recognition in conjunction with voice recognition, shown in FIG. 3B. Consider, for example, scenarios wherein the combination of video and audio recognition may result in misclassification of a video segment as being part of a commercial break when it is really part of program type content. For example, during a program, no primary cast members may be detected as either speaking or being in frame for an extended period of time, such as 10 seconds, or even a few minutes. This may occur because no primary cast members are actually speaking or in frame for an extended period of time, or because the VRS or FRS has not correctly identified a primary cast member who is actually speaking or in frame for the extended period of time. Examples of using rules in a rules database may include the following rules which may be applied individually or in combination with each other:

1. Time segment where no recognition data is detected must be at least 15 seconds to be classified as a potential commercial break. As discussed above, the average commercial break is currently about 2 minutes, and commercial breaks are rarely less than 15 seconds.

2. Time segment where no recognition data is detected cannot be within 5 minutes of a previously detected potential commercial break to be classified as a potential commercial break. As known in the art, commercial breaks typically do not occur a very short time frame after a previous commercial break. The 5 minute value is just one example, and the actual value can be selected based on real observations of commercial break frequencies during particular programs.

3. If there is a succession of consecutive time segments that are 30 seconds or less, and which repeatedly switch back and forth between recognition data being detected and recognition not being detected, the time segments where recognition data is not detected are not classified as a potential commercial break. Even if a commercial break is very short (e.g., 30 seconds or less), commercial breaks typically do not follow a pattern of being interspersed between very short program type content. This rule may only be selectively applied depending upon the program content type, as identified by the EPG. For example, this rule would generally be applicable for sitcoms and movies, but would be less applicable for live events (e.g., sports) because commercial breaks are often taken whenever there is an opportunity to do so, such as when game activity has stopped.

4. Referring to FIGS. 3A and 3B, when sampling periods are very short, such as 1 second, it would not be expected that a NO result, or even a few consecutive NO results, would be sandwiched between a much longer string of YES results, and vice-versa. Accordingly, one of the rules may be to presume that these results are incorrect, and the NO result(s) would be changed to YES, and vice-versa, when performing the time segment analysis.

Other rules which rely upon well-known characteristics of program type content and commercial breaks within video data streams may be employed in conjunction with the kinds of rules discussed above.

In addition, the rules may be formed using conventional methods for detecting commercials discussed above, including "feature-based detection" and "recognition-based detection." For example, uncertainties as to whether a particular time segment is a potential commercial break may be resolved using any one or combination of characteristics associated with "feature-based detection" and "recognition-based detection." For example, a 30 second time segment having no recognition data, but which appears 6 minutes after a previously detected potential commercial break may not fall within any of the rules of the rules database for excluding the time segment as being a potential commercial break, but there is still significant uncertainty about such a classification due to its relative closeness in time to a previously detected commercial break. However, if multiple frames of black with no audio (not just no audio of primary cast members) are detected as being displayed within the 30 second time segment, or if the video is high in "action" during that time segment, the 30 second time segment may be classified as being a potential commercial break.

D. Confidence Levels and Use of Rules Database

The [RESULT] may further include a confidence level for each sample. It is well-known in the art that automatic recognition software determines a confidence level that a particular item or person has been recognized, either by their voice or image, depending upon whether speaker recognition or facial recognition is being performed. In one embodiment, if the confidence level that a primary cast member has been detected is greater than or equal to a predetermined level, a Boolean output of YES occurs. Likewise, if the confidence level that a primary cast member has not been detected is greater than or equal to the predetermined level, a Boolean output of NO occurs. In these scenarios, the rules database may not be used. However, if the confidence level that a primary cast member has or has not been detected is below the predetermined level, certain rules of the rules database may be applied to conclude that program type content or a commercial break is likely present during the sampling period.

Certain conditions may inherently result in a high confidence level, such as detecting the presence of multiple primary cast members within the same sampling period, or detecting both audio and image data of the same primary cast member during a sampling period.

E. Non-Boolean [Result]

In the embodiments of FIGS. 3A and 3B, the [RESULT] is a Boolean output of YES or NO. However, in an alternative embodiment, the result may be the name of the program (e.g., Friends, Seinfeld, Big Bang Theory). The name of program may be derived from the detected primary cast member or members. For example, if the voice of a particular Friends cast member is detected, and that is the only currently broadcast or streamed program that includes that particular person as a primary cast member, then the result may be populated with the name of the program, instead of "Y." Alternatively, an electronic program guide (EPG) may be consulted to confirm that a program associated with the detected primary cast member is currently scheduled be broadcast or streamed, thereby confirming that the [RESULT] should be populated with the name of the program.

F. Use of EPG for Reduction of Processing Time and Processing Resources

It is a well-known practice to use famous celebrities in commercials, and thus there is a high probability that primary cast members may appear in some currently broadcast or streamed commercials. Accordingly, the audio or visual detection of a primary cast member may not be sufficient to accurately classify video stream content as program type content or a commercial break. EPGs indicate exactly what program is scheduled to be broadcast or streamed at a particular time frame. This information may be used for multiple purposes. The EPG information may be used to drastically reduce the processing time and processing resources required by the search engines of the VRS and/or FRS because audio and/or image samples only need to be compared to the previously stored audio and/or images of primary cast members of the currently broadcast or streamed program, as opposed to searching through all primary cast members stored in the database of previously stored audio and/or images of primary cast members. While a primary cast member of the currently broadcast or streamed program, could, potentially, appear in a commercial shown during the currently broadcast or streamed program, the statistical likelihood of this occurring is very low, and such false positive results may be flagged (corrected) by combining the techniques of the present invention with rules of the rules database as described above to avoid such misclassification. Metadata in the video data stream may also include EPG-type data, such as the program name of the currently broadcast or streamed program.

To summarize how the EPG data or metadata in the video data steam may be used, the EPG data or metadata is used to identify the currently broadcast or streamed program. The first database 708 or 708' is then accessed to identify the previously or dynamically identified persons (e.g., primary cast members) who are associated with the currently broadcast or streamed program. The automatic recognition software 716 only checks the sampled audio and/or video for this subset of previously or dynamically identified persons.

G. No EPG Embodiment

The scope of the present invention also includes an embodiment that does not leverage knowledge of the currently broadcast or streamed program obtained from an EPG. As discussed above, this embodiment requires more processing time and processing resources because the search engine of the VRS and/or FRS must compare audio and/or image samples to the previously stored audio and/or images of primary cast members of all primary cast members stored in the database of previously stored audio and/or images of primary cast members. This embodiment also will preferably rely upon using some of the rules of the rules database as described above to avoid misclassification because there is a significant likelihood that some primary cast members will be detected in commercials, and EPG data would not be available to limit the field of primary cast members who are expected to appear in the current program, and thus avoid such false positive results.

H. Dynamically Identified Persons (Dynamic Learning of Identified Persons)

As discussed above, in one embodiment of the present invention, the identified persons need not be previously identified, but instead may be identified on-the-fly. This avoids the need to pre-build a database of recognition data for subsequent use when determining whether a time segment is a potential commercial break due to the absence of any such recognition data 710. Accordingly, it is not necessary to perform discrete training sessions using known program content to build the database of recognition data. This means that there is no need for the VSTS or VRS in FIG. 3A, or the ISTS or FRS in FIG. 3B.

Another advantage of the dynamic embodiment is that it can better capture guest cast members and constantly changing cast members, since these cast members will repeatedly be seen and/or heard during a program, whereas discrete training sessions may miss such persons depending upon what program content is used to build the database of recognition data. The more complete that the database of recognition data is, the more accurate the identification will be of time intervals where no recognition data is detected, and thus the more accurate the detection of ad blocks will be.

In the dynamic embodiment, it may also be necessary in certain instances to perform the functions of the automatic recognition software 716 and the time segment analysis on a delayed basis (i.e., retroactively). This is because the recognition data is being built over time, instead of being pre-populated, and thus it may not be sufficiently complete until after some commercial breaks have occurred within a given time window of a video data stream. Unless there is a critical need for real-time ad break detection, this delayed analysis should not cause any performance issues.

In the dynamic embodiment, it is also necessary to identify when a recurring face and/or voice in a video data stream is actually associated with a commercial, and not a program, so that the recognition data is not populated with persons who appear in commercials, since this would lead to erroneous results in Table 1 above. An additional set of rules may be provided to address this issue. For example, a recurring face and/or voice that appears for only a brief period of time (e.g., no more than 60 seconds) within a 30-60 minute segment of a video data stream would be presumed to be an actor in a commercial and would be ignored and not entered as recognition data into the first database 708'. Likewise, a recurring face and/or voice that repeatedly appears at extended intervals during the same 30-60 minute segment of the video data stream would be presumed to be an identified person associated with a program, and would have its recognition data entered into the first database 708'. Similar to the other embodiment, EPG data may be used to identify the program associated with the identified person, as well as to identify time windows where a recurring face and/or voice should appear.

In the dynamic embodiment, a temporary database may be used to store recognition data of any recurring faces and/or voices that are detected in the video data stream, and then rules such as those described above are subsequently applied to remove any recognition data from the temporary database that does not meet the rules for being associated with likely program type content. The first database 708' is then populated with only the recognition data that does not subsequently get removed from the temporary database. The temporary database will also be populated with any newly occurring faces and/or voices since it is not immediately known whether those faces and/or voices will appear or be heard again in the video data stream. If there is no recurrence of these newly occurring faces and/or voices after a predetermined period of time, such as 15 minutes, or during the time window of a specific program as indicated by EPG data, then the entries for these newly occurring faces and/or voices are deleted from the temporary database. Of course, as discussed above, even if there is such a recurrence, other rules are applied to identify recognition data is not likely to be program type content, and a similar removal process occurs.

Also, in the dynamic embodiment, there is no human curator to associate a particular identified person with their respective speaker recognition data 712 and facial recognition data 714, as shown in FIG. 4A. Accordingly, the first database 708' in FIG. 4B may have separate entries (separate unique ID numbers) for the speaker recognition data 712 and the facial recognition data 714 for the same identified person. However, the performance of the system would not be affected by this difference in the table structure of the first database 708' since the system only requires detecting or not detecting recognition data of an identified person within a time interval, regardless of whether the type of recognition data is associated with the same identified person. For convenience in illustrating the main differences between the first database 708' in FIG. 4B and the first database 708 in FIG. 4A, the first database 708' in FIG. 4B is shown as having the speaker recognition data 712 and the facial recognition data 714 associated with the same identified person, which is similar to the first database 708 in FIG. 4A. While it is not necessary to do so, various techniques may be used to associate the speaker recognition data 712 and the facial recognition data 714 with the same identified person in the dynamic embodiment. For example, speaker recognition data 712 and the facial recognition data 714 that is captured as recurring at the same time stamps may be presumed to be associated with the same identified person.

The present invention may be implemented with any combination of hardware and software. If implemented as a computer-implemented apparatus, the present invention is implemented using means for performing all of the steps and functions described above.

When implemented in software, the software code for the video processor 702 and search engines of the voice recognition system 726 and the facial recognition system 728 can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein for the video processor 702 and the search engines of the voice recognition system 726 and the facial recognition system 728 may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The video processor 702 and the search engines of the voice recognition system 726 and the facial recognition system 728 are not general-purpose computers, but instead are specialized computer machines that perform a myriad of video processing and search functions that are not native to a general-purpose computer, absent the addition of specialized programming.

The video processor 702, EPG 718, automatic recognition software 716, first and second databases 708 or 708', second database 720, processor 722, and rules database 724 may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method of identifying potential commercial breaks in a video data stream that includes (i) segments of program type content, and (ii) commercial breaks interspersed between adjacent segments of program type content, each commercial break being a block of commercial content, each block including one or more successive individual commercials, wherein selected segments of program type content include a plurality of distinct programs, each program having one or more identified persons associated with the program, and wherein a first database stores recognition data of the identified persons associated with each of the programs, the method comprising:
   (a) receiving a video data stream in a video processor;
   (b) sampling, by the video processor, the video data stream at consecutive time intervals;
   (c) identifying, using automatic recognition software which is in electronic communication with the video processor and the first database of recognition data, whether any recognition data is detected in each of the consecutive time intervals, wherein the video processor knows which program is currently present in the video data stream, and wherein the identification of whether any recognition data is detected in each of the consecutive time intervals is performed using only the identified persons who are associated with the program that is currently present in the video data stream;
   (d) electronically recording in a second database for each time interval whether or not any recognition data has been detected; and
   (e) identifying, by a processor that is in electronic communication with the second database, time segments that are potential commercial breaks by identifying a plurality of consecutive time intervals where no recognition data is detected,
   wherein the one or more identified persons associated with the program are dynamically identified persons associated with the program, wherein the dynamically identified persons are identified on-the-fly and are not previously identified persons associated with a program, and wherein the first database stores recognition data of the dynamically identified persons associated with each of the programs, and wherein the identification of whether any recognition data is detected in each of the consecutive time intervals is performed using only the dynamically identified persons who are associated with the program that is currently present in the video data stream.

2. The method of claim 1 further comprising:
   (f) determining by the processor whether the identified plurality of consecutive time intervals where no recognition data is detected meet one or more rules in a rules database that are indicative of a potential commercial break, thereby improving the accuracy of identifying a potential commercial break.

3. The method of claim 1 wherein the recognition data of the identified persons associated with the programs includes speaker recognition data, or facial recognition data, or speaker and facial recognition data.

4. An apparatus for identifying potential commercial breaks in a video data stream that includes (i) segments of program type content, and (ii) commercial breaks interspersed between adjacent segments of program type content, each commercial break being a block of commercial content, each block including one or more successive individual commercials, wherein selected segments of program type content include a plurality of distinct programs, each program having one or more identified persons associated with the program, and wherein a first database stores recognition data of the identified persons associated with each of the programs, the apparatus comprising:
   (a) a video processor configured to:
      (i) receive a video data stream, and
      (ii) sample the video data stream at consecutive time intervals;
   (b) automatic recognition software in electronic communication with the video processor and the first database of recognition data configured to identify whether any recognition data is detected in each of the consecutive time intervals, wherein the video processor knows which program is currently present in the video data stream, and wherein the identification of whether any recognition data is detected in each of the consecutive time intervals is performed using only the identified persons who are associated with the program that is currently present in the video data stream;
   (c) a second database in communication with the automatic recognition software that records for each time interval whether or not any recognition data has been detected; and
   (d) a processor in electronic communication with the second database configured to identify time segments that are potential commercial breaks by identifying a plurality of consecutive time intervals where no recognition data is detected,
   wherein the one or more identified persons associated with the program are dynamically identified persons associated with the program, wherein the dynamically identified persons are identified on-the-fly and are not previously identified persons associated with a program, and wherein the first database stores recognition data of the dynamically identified persons associated with each of the programs, and wherein the identification of whether any recognition data is detected in each of the consecutive time intervals is performed using only the dynamically identified persons who are associated with the program that is currently present in the video data stream.

5. The apparatus of claim 4 further comprising:
   (e) a rules database including one or more rules that are indicative of a potential commercial break, wherein the processor is further configured to determine whether the identified plurality of consecutive time intervals where no recognition data is detected meet one or more rules in a rules database that are indicative of a potential commercial break, thereby improving the accuracy of identifying a potential commercial break.

6. The apparatus of claim 4 wherein the recognition data of the identified persons associated with the programs includes speaker recognition data, or facial recognition data, or speaker and facial recognition data.

\* \* \* \* \*